United States Patent
Lehane (10) Patent No.: US 11,586,956 B2
(45) Date of Patent: Feb. 21, 2023

(54) SEARCHING APPARATUS UTILIZING SUB-WORD FINITE STATE MACHINES

(71) Applicant: Keysight Technologies, Inc., Santa Rosa, CA (US)

(72) Inventor: Andrew Robert Lehane, Edinburgh (GB)

(73) Assignee: Keysight Technologies, Inc., Santa Rosa, CA (US)

( * ) Notice: Subject to any disclaimer, the term of this patent is extended or adjusted under 35 U.S.C. 154(b) by 202 days.

(21) Appl. No.: 13/903,906

(22) Filed: May 28, 2013

(65) Prior Publication Data

US 2014/0358837 A1 Dec. 4, 2014

(51) Int. Cl.
*G06N 5/04* (2006.01)
*G06N 5/047* (2023.01)
*H04L 12/64* (2006.01)

(52) U.S. Cl.
CPC ......... *G06N 5/047* (2013.01); *H04L 12/6418* (2013.01)

(58) Field of Classification Search
CPC ...................................................... G06N 5/047
See application file for complete search history.

(56) References Cited

U.S. PATENT DOCUMENTS

| | | | |
|---|---|---|---|
| 5,543,721 A | 8/1996 | Knuuti | |
| 5,586,266 A * | 12/1996 | Hershey | H04L 43/10 370/252 |
| 6,026,350 A | 2/2000 | Tustin et al. | |
| 60,236,350 | 2/2000 | Tustin et al. | |
| 7,885,944 B1 * | 2/2011 | Bruening | G06F 17/30634 707/694 |
| 8,121,574 B2 | 2/2012 | Zelder | |
| 2003/0065800 A1 | 4/2003 | Wyschogrod et al. | |
| 2007/0192863 A1 * | 8/2007 | Kapoor | G06F 9/505 726/23 |

(Continued)

FOREIGN PATENT DOCUMENTS

DE 69230756 T2 7/2000
DE 10121535 A1 11/2002

(Continued)

OTHER PUBLICATIONS

Vahid Rahmanzadeh, et al, A Multi-Gb/s Parallel String Matching Engine for Intrusion Detection Systems, CSICC 2008, CCIS 6, pp. 847-851, 2008.*

(Continued)

*Primary Examiner* — Lut Wong (57) ABSTRACT

An apparatus that searches an input stream having a sequence of N-bit wide data words for a pattern using a plurality of small FSMs is disclosed. The apparatus includes a plurality of sub-word FSMs and a combiner. Each sub-word FSM has an input word size less than N-bits. Each FSM processes a corresponding segment of the N-bit words and generates a match output indicative of a possible match to the pattern when one of the input words to that FSM is received and that FSM moves to a predetermined match state. The combiner receives the match outputs from all of the sub-word FSMs and generates a pattern match output if all of the sub-word FSMs indicate a match to the pattern. The pattern is a variable pattern. In one embodiment, the FSMs are single bit FSMs.

14 Claims, 10 Drawing Sheets

(56) References Cited

U.S. PATENT DOCUMENTS

| | | | | |
|---|---|---|---|---|
| 2007/0233628 | A1* | 10/2007 | Sherwood | G06N 5/04 706/46 |
| 2010/0175130 | A1* | 7/2010 | Pawlowski | G06F 7/02 726/22 |
| 2011/0185077 | A1 | 7/2011 | Bremler-Barr | |
| 2013/0159670 | A1* | 6/2013 | Noyes | G06F 15/82 712/36 |

FOREIGN PATENT DOCUMENTS

| | | |
|---|---|---|
| DE | 202007010239 U1 | 10/2007 |
| DE | 102008005204 A1 | 7/2009 |
| DE | 102014105218 A1 | 12/2014 |
| GB | 2343790 A | 5/2000 |
| GB | 2515867 B | 1/2017 |
| JP | H04-003251 A | 1/1992 |
| JP | 2003-017780 A | 1/2003 |
| JP | 2003-080366 A | 3/2003 |
| JP | 2009-151757 A | 7/2009 |
| JP | 6613019 B2 | 11/2019 |

OTHER PUBLICATIONS

Chu, "RTL Hardware Design Using VHDL", John Wiley & Sons, 2006.*
Prasanna "Fast regular expression matching using FPGAs" Proceedings of the 9th international IEEE symposium on FPGAs, 2001.*
Kim et al, A Memory-Efficient Bit-Split Parallel String Matching Using Pattern Dividing for Intrusion Detection Systems, 2011.*
Xue et al, Variable Length Pattern Matching for Hardware Network Intrusion Detection System, 2010.*
Bille et al, String Matching with Variable Length Gaps, 2010.*
Kucherov et al, Matching a set of strings with variable length don't cares, 1996.*
Rahman et al, Finding Patterns with Variable Length Gaps or Don't Cares, 2006.*
Haapasalo et al, Online Dictionary Matching with Variable Length Gaps, 2011.*
Becchi et al, Extending Finite Automata to Efficiently Match Perl-Compatible Regular Expressions (Year: 2008).*
Cerf, ASCII format for Network Interchange (Year: 1969).*
Chang et al, Multi-Character Processor Array for Pattern Matching in Network Intrusion Detection System (Year: 2008).*
Q.I. Ali S. Iazim ("Design and implementation of an embedded intrusion detection system for wireless applications" 2010) (Year: 2010).*
1 Search Report, Germany Application No. 102014105218.8 dated Aug. 12, 2014.
Lin, Cheng-Hung, Accelerating Regular Expression Matching Using Hierarchical Parallel Machines on GPU, IEEE Communications Society, 2011.
Office Action dated Jun. 21, 2016, UK Application No. GB140606462.0.
Notification of Grant dated Dec. 19, 2016, GB Patent Serial No. GB2515867.
Office action dated Mar. 2, 2018, Japan Patent Office No. 2014085273.
Jung, et al., Performance of FPGA Implementation of Bit-split Architecture for Intrusion Detection System, IEEE International Parallel & Distributed Processing Symposium, Mar. 2007, pp. 2-9.
Baker, Regular Expression Software Deceleration for Intrusion Detection Systems, 2006 International Conference on Field Programmable Logic and Applications, 2006.
Office action dated Jan. 29, 2019, Japan Application No. 2014-085273, no translation available.
Kaneta, et al., Fast Hardware Algorithm for High-Speed Stream Processing Based on Bit-Parallel Method, Dec. 25, 2009, The First Forum on Data Engineering and Information Management, DEIM Forum, Journal, pp. 1-5, no translation available.
Notice of Allowance dated Oct. 4, 2019, Japan Application No. 2014-085273.
GB Search Report dated Dec. 14, 2016, Application No. GB1406462.0, 2 pgs.
Krste Asanovic et al. "The Landscape of Parallel Computing Research: A View from Berkeley", Electrical Engineering and Computer Sciences University of California at Berkeley, Dec. 18, 2006, Technical Report No. UCB/EECS-2006-183, pp. 1-56.
Krste Asanovic et al. "The Parallel Computing Laboratory at U.C. Berkeley: A Research Agenda Based on the Berkeley View", Electrical Engineering and Computer Sciences University of California at Berkeley, Mar. 21, 2008, Technical Report No. UCB/EECS-2008-23, pp. 1-25.
Guy E. Blelloch, "Sans a Primitive Parallel Operations", Carnegie Mellon University, Nov. 1989, pp. 1-45.
Yoginder S. Dandass et al., "Accelerating String Set Matching in FPGA Hardware for Bioinformatics Research", BMC Bioinformatics, Apr. 15, 2008, pp. 1-11.
Andrew Lehane et al., "Detecting Suspicious Intrusions into Next-generation Networks", Agilent Measurement Journal, vol. 2. Jun. 2007, pp. 1-6.
Gerald Tripp, "A parallel 'String Matching Engine' for use in high speed network intrusion detection systems", Journal in Computer Virology, 2(1), 21-34, 2006, pp. 1-18.
Gerald Tripp, "Flexible expression based deep packet inspection and analysis at multi-gigabit link rate", Final Project Report', Computer Science at Kent, A collaboration between the University of Kent and Agilent Technologies Inc., Mar. 2009, pp. 1-102.
Zhijia Zhao et al., "Speculative Parallelization Needs Rigor—Probabilistic Analysis for Optimal Speculation of Finite-State Machine Applications",. In Proceedings of the 21st international conference on Parallel architectures and compilation techniques (PACT '12), Sep. 19-23, 2012, ACM, New York, NY, USA, pp. 1-2.
M. O. Rabin et al., "Finite automata and their decision problems", IBM Journal of Research and Development, 3(2): Apr. 1959, pp. 114-125.

* cited by examiner

SEARCHING APPARATUS UTILIZING SUB-WORD FINITE STATE MACHINES

BACKGROUND OF THE INVENTION

Finite state machines (FSMs) are often used for searching a data string for a specified pattern. An FSM is a machine that has a plurality of states connected by "directed edges". The FSM moves from its current state to a next state each time a new input word is received by the FSM. Hence, each edge has one or more values associated with that edge. When the FSM receives an input word having a value equal to the value on an edge, and the FSM is in the state associated with the input side of the edge, the FSM changes to the state associated with the output side of the edge. The FSM then proceeds to process the next input word. The data string is a sequence of digital values. The digital values can be from any of a number of sources. For example, digital transmission on a communication link. In another example, the data string could be a string of text encoded in ASCII in which each digital value is an 8-bit word. The data string could also be a sequence of measurements such as those produced by a digital oscilloscope, in which each digital value could be some larger word, e.g., 12 or 16 bits. In some cases, the data string could involve much larger words. For example, the data string could be a program in which instructions are 64-bit words.

Typically, the search problem involves searching this sequence for a specified pattern that can be represented as a regular expression. This type of problem is encountered in numerous data processing problems. For example, a long text document may be searched for a specific phrase. Similarly, in instruments such as oscilloscopes, a very long string of measurements may need to be searched for a specific wave pattern. In the case of computer code, searches for malware are common in virus checking programs.

If a single FSM is used for the search, the time to complete the search is a linear function of the length of the data string. In the case of a long string of measurements, e.g., $10^{12}$ data points, the search time can be prohibitive. In addition, in applications requiring real time processing, the time to process the data points even when fewer points are involved can be prohibitive. A modern digital oscilloscope can generate 160 GigaSamples per second per channel on up to two channels and 80 GigaSamples per second per channel on up to four channels. The problem of finding a pattern in the data in time to capture the signal that includes that pattern can be too long to use an FSM as the triggering processor.

One method for decreasing the search time utilizes an FSM that processes multiple words at each state update. This is equivalent to building an FSM with a multiple of the original word size. If a two word wide FSM is used, the search time is reduced by a factor of two. Unfortunately, there is a limit to the size of the input word that is set by the amount of memory needed to implement the FSM.

The amount of memory needed to implement an FSM is an exponential function of the word size. In the general case, the FSM is implemented using a table having one row for each possible input value and one column for each state. The table maps the current state and current input to the next state for the FSM. The number of rows in the table is $2^N$, where N is the number of bits in the input word. Hence, building memory based FSMs for input words that are greater than 16 bits presents significant challenges. In some problems, the amount of memory can be reduced using various compression techniques: however, there are always problems for which these techniques do not lead to a practical implementation.

To improve the processing speed of an FSM beyond that available by using faster circuits, machines in which a number of FSMs that operate in parallel have been suggested. Unfortunately, prior art search engines utilizing parallel FSMs are limited in the types of patterns that can be searched. For the purposes of the present discussion, it is useful to separate the types of patterns that can be represented by regular expressions into two classes. The first class will be referred to as "fixed patterns". For example, a text string could be searched for the pattern "var=x". A fixed pattern has a known fixed length and is satisfied by only one pattern in the input stream. The second class of pattern will be referred to as "variable patterns". These patterns have unknown lengths or are satisfied by a number of different strings. For example, "var=[a-z]+;" is satisfied by any pattern that starts with "var=" followed by any number of characters in the lowercase alphabet followed by ";". This pattern generates strings that cannot be predicted in advance in terms of length, no less exact content. Many search problems of interest, such as those utilized in virus detection, require a search for a variable pattern.

Search engines based on parallel FSMs for fixed patterns are known to the art. Consider a machine in which each of a plurality of FSMs processes data from a particular stream, referred to as a lane. If the search pattern can be divided across L lanes, then a search engine with L processors can be used. In this arrangement, the input data stream is striped across the lanes such that the first FSM processes an input string consisting of words 1, L+1, 2L+1, etc. The second FSM processes an input string consisting of words 2, L+2, 2L+2, . . . , and so on. Each FSM searches for a particular pattern that is 1/N the length of the total pattern. When each FSM finds its assigned match, the search engine outputs the match to a combining circuit that tests to be sure that all of the FSMs found a match simultaneously. Unfortunately, a variable pattern cannot be divided across a fixed number of processors in this manner, and hence, this strategy fails for searches involving variable patterns.

SUMMARY

The present invention includes an apparatus that searches an input stream having a sequence of N-bit wide data words for a pattern. The apparatus includes a plurality of sub-word FSMs and a combiner. Each sub-word FSM has an input word size less than N-bits. Each FSM processes a corresponding segment of the N-bit words and generates a match output indicative of a possible match to the pattern when one of the input words to that FSM is received and that FSM moves to a predetermined match state. The combiner receives the match outputs from all of the sub-word FSMs and generates a pattern match output if all of the sub-word FSMs indicate a match to the pattern. The pattern is a variable pattern.

In one aspect of the invention, the apparatus emulates a single FSM operating on the N-bit wide words to match the pattern. In this case, the match outputs correspond to different possible match states in the single FSM.

In one exemplary embodiment, the sub-word FSMs are single bit FSMs.

In one aspect of the invention, the apparatus processes a plurality of N-bit data words in the sequence when each of the sub-word FSMs moves between any pair of states in the FSM.

DETAILED DESCRIPTION

The present invention provides a parallel search engine utilizing FSMs that have a word size significantly smaller than the word size of the input data and that can operate in parallel to search for a variable pattern. To simplify the following discussion, the word size utilized by an FSM will be referred to as the FSM word size. This word size could be larger or smaller than the word size of the input string being searched. The word size of the string being searched will be referred to as the input word size. In the cases of interest here, the FSM word size is significantly less than the input word size. An FSM that operates on a FSM word size that is less than that of the input word size will be referred to as a sub-word FSM. The smallest sub-word FSM has an FSM word size of 1 bit.

The manner in which the present invention provides its advantages can be more easily understood in terms of a search engine that includes a plurality of single bit FSMs operating in parallel to emulate a larger FSM that searches for a pattern in an input data sequence. The larger FSM will be referred to as the one word FSM in the following discussion. Assume that a one word wide search engine has already been designed for a pattern of interest. Methods for generating an FSM for a pattern that is represented by a regular expression are known to the art, and hence, will not be discussed in detail here.

The input words for the sequence are N-bits wide and the number of states in the one word FSM will be denoted by M. The one word FSM is typically represented by a state diagram in which the various states are connected by a plurality of "edges" that represent transitions between the states. Each edge has a starting state and an ending state and one or more "tokens". The ending state is the next state for the FSM when the current state is the starting state and a word having the value of one of the tokens is received. In principle, there are $2^N$ possible token values for each state, since each N-bit input word has $2^N$ possible values. Hence, the FSM can be operated by a simple table lookup operation in a table having $2^N$ rows and M columns that gives the next state for each of the M possible current states and the current input word. Hence, the time to make a transition is essentially independent of the number of states in the FSM.

For large values of N, the memory required by this table makes this simple approach impractical. N values of 32 or 64 bits are often needed for applications in which the input data stream is a series of measurements from an instrument such as a digital oscilloscope. In such applications, the FSM is used to parse the waveform measured by the instrument to identify features of interest. Hence, a mechanism for reducing the amount of memory required to implement a large word FSM is needed.

In one embodiment of the present invention, N single bit FSMs are used in parallel to search the input stream. As will be discussed in more detail below, one or more of the single bit FSMs may have a larger number of states than the N-bit word FSM. Denote this maximum number of states by M'. The single bit FSMs require tables that have only two rows by M' columns at most. There are now N such FSMs operating in parallel. In the case of a one byte search word, N=8 and the memory requirement is less than or equal to 16 rows by M columns as compared to 256 rows by M states. Even if the number of states is significantly higher in the 1-bit FSMs, there is still a significant memory savings.

In general, the N single bit FSMs working in parallel will require approximately the same time to complete the search. Hence, the major savings in this approach is one of cost, since the cost is a direct function of the memory requirement. However, the smaller size of the FSMs may also result in some speed improvement due to using a simpler circuit. In addition, this approach makes large input word FSMs practical.

To obtain a significant speed improvement over the one word FSM, an FSM that operates on two words at a time can be derived from the original one word FSM. This new two word FSM is then implemented as 2N single bit FSMs working in parallel. In this case, a speed factor of two is provided by the parallel processing as the length of the input stream is effectively halved. Additional improvements can be realized by using an FSM having a search word that is a higher multiple of N and then implementing a corresponding collection of single bit FSMs. In this case memory savings can become significant.

To simplify the following discussion, it will be assumed that the sub-word FSMs are single bit FSMs. The manner in which other size sub-word FSMs can be utilized will then be discussed in more detail. In general, the N-bit FSM has at least one state that is a "matched" state. When the FSM enters this state, a signal is generated to the processing hardware attached to the FSM indicating that a match has been found for one of the target patterns for which the FSM was created. There may be multiple such match states within an FSM.

Each single bit FSM operates on a corresponding bit of the input words to the N-bit FSM. Each single bit FSM must make its transitions without regard to the transitions being made in the other single bit FSMs. When an input word to the N-bit FSM would trigger a match in that FSM because the target pattern had been found, each single bit FSM must likewise report a match. It should be noted that the single bit matches may specify a plurality of possible match states in the larger FSM. A combining processor receives the collection of match outputs from the single bit FSMs and determines if there is a common state reported by all of the single bit FSMs. That common state is then reported out as the matched state.

Given a search pattern consisting of a regular expression, there is a minimal FSM that implements that regular search pattern. The minimal FSM is the FSM with the minimum number of states that implements the search pattern. The minimum FSM has a unique topology. Given any FSM for a particular pattern, the minimal pattern can be derived by removing or merging states. Any state that is unreachable from the initial state for any input can be removed. Any two states that cannot be distinguished from one another for any input can be merged together. When the FSM no longer has any unreachable states or indistinguishable states, it is the minimal FSM.

An FSM that implements a search for a variable pattern has a minimal FSM in which there are multiple tokens on at least one edge or one that contains direct loops created by wildcards such as "*". That is, there will be two states in the minimal FSM that have the property that a transition from the first state to the second state will occur for multiple different input values, or repeating input values or, possibly, no input value at all. In contrast, an FSM that searches for a fixed pattern has a minimal FSM that has only one single token on all edges to a given state.

Prior art techniques for deriving a plurality of single bit FSMs from a one word FSM only work reliably if the one word FSM has a corresponding search pattern that is a fixed pattern. In addition, FSMs that include multiple tokens on an edge but have a fixed length pattern also present challenges when attempting to implement such FSMs as a plurality of sub-word FSMs.

The manner in which the present invention provides its advantages can be more easily understood with reference to a simple example. Consider a stream of data words that is to be checked for correct parity. Each data word has either even or odd parity. The regular expression for a parity calculator is as follows ({even}*{odd}{even}*{odd})*{even}*

Here "even" stands for a word in the stream having even parity and "odd" stands for a word in the stream having odd parity. The regular expression is satisfied by any number (zero or more) words with even parity followed by a word with odd parity, followed by any number of words with even parity followed by a word with odd parity repeated any number of times followed by any number of words with even parity. This pattern has a variable and unknown length, since "*" means zero or more of the preceding value. In addition, the minimal FSM for finding this pattern has multiple tokens on an edge between two states that are indistinguishable at the bit level for all known inputs.

To simplify the example, the data stream will be assumed to be 3-bit words. i.e., the integer values from 0 to 7. It should be noted that 0, 3, 5, and 6 have even parity and 1, 2, 4, and 7 have odd parity. Hence, for this 3-bit word case, the regular expression is as follows:

({0,3,5,6}*{1,2,4,7}{0,3,5,6}*{1,2,4.7})*{0,3.5,6}*

To improve legibility, commas have been used to separate the integer tokens and braces '{' and '}' are used to group the tokens together.

Figure 1:
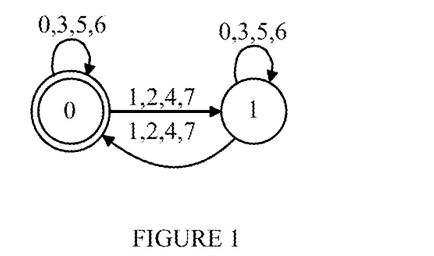
FIG. 1 illustrates the minimal FSM for implementing a parity calculator.

The minimal FSM for implementing this pattern is shown in FIG. 1. In the following discussion, the states that trigger a "match" output are shown with double circular boundaries. The match occurs when the state "0" is entered. That is, a match occurs when an input of 1, 2, 4, or 7 is received and the FSM is in state "1" or 0, 3, 5, or 6 and the FSM is in state "0".

Figure 2:
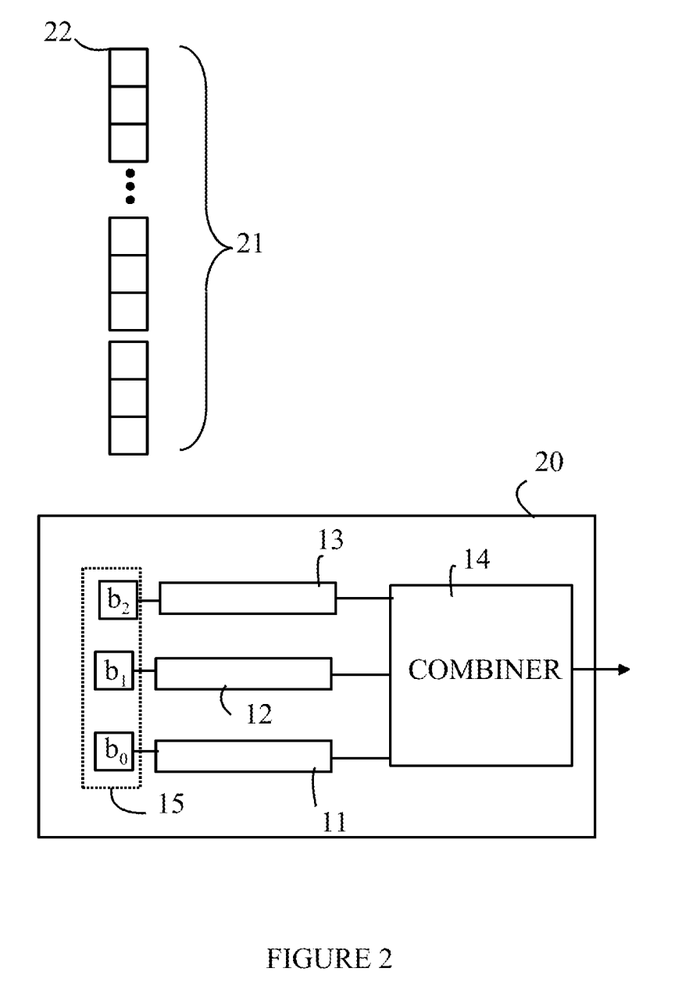
FIG. 2 illustrates an apparatus for implementing the pattern discussed above.

Refer now to FIG. 2, which illustrates an apparatus 20 for implementing the pattern discussed above. The input string 21 to apparatus 20 consists of a sequence of 3-bit words 22. Each word is shifted into the input register 15 of apparatus 20. Input register 15 presents each of the bits in the current word to a different single bit FSM. The FSMs are shown at 11-13. Each FSM operates solely on the single bit stream that enters that FSM. Hence, FSM 11 operates solely on the least significant bits, $b_0$, of the input words: FSM 12 operates solely on the next most significant bit, $b_1$, and FSM 13 operates solely on the most significant bits, $b_2$. When any of the FSMs finds a match, that FSM reports the match to a combiner 14. If combiner 14 receives a match report indicating the same match state from all of the FSMs, combiner 14 reports out that match.

Since each of the FSMs only operates on a single bit stream, that FSM must make state changes based solely on that bit value and those state changes must correspond to state changes in the FSM that would be operating on the whole words for the matched states of the one word FSM. However, as will be explained in more detail below, a state of a one-bit FSM may correspond to multiple states in the one-word FSM. The bit values for the eight states in this example are shown below, the least significant bit is $b_0$:

| Word Value | $b_0$ | $b_1$ | $b_2$ |
|---|---|---|---|
| 0 | 0 | 0 | 0 |
| 1 | 1 | 0 | 0 |
| 2 | 0 | 1 | 0 |
| 3 | 1 | 1 | 0 |
| 4 | 0 | 0 | 1 |
| 5 | 1 | 0 | 1 |
| 6 | 0 | 1 | 1 |
| 7 | 1 | 1 | 1 |

The FSM in FIG. 1 transitions on word values of 1, 2, 4, and 7. FSM 11 only "sees" the $b_0$ values. However, values 1 and 7 correspond to a 1 in the input to FSM 11, and values 2 and 4 correspond to a 0 in the input to FSM 11. Similarly, the second set of values 0, 3, 5, and 6 do not present a unique bit value to FSM 11. Hence, when FSM 11 receives a 0, it does not know whether to transition or not to the next state, since the 0 could be from a 2 or 4 or from a 0 or 6 and 2 and 4 are represented by different edges from 0 and 6. A similar problem exists for FSMs 12 and 13. These problems arise from multiple tokens being present on one or more edges that transition to different states. As a result, prior art techniques for converting a word wise FSM to a plurality of sub-word FSMs are limited to fixed patterns that have only one token, or a set of tokens that do not need to be distinguished, per edge. For example, if an FSM is designed to recognize an input of 's' or 't', either in upper or lower case, then the inputs can actually be either 'S', 's' or 'T' 't'. In ASCII, bit 5 is the bit responsible for discerning case sensitivity; upper case having the bit set to 0 and lower case having the bit set to 1. Hence, the value of bit 5 is not important in this case.

Figure 3:
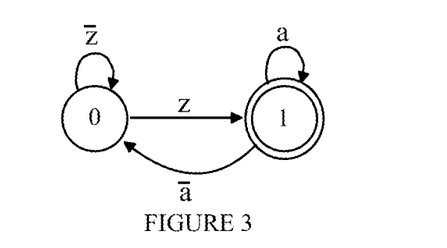
FIG. 3 illustrates the word wise FSM for a variable length pattern "za*".

A similar problem occurs when an "*" is in the pattern even if the edges have only one token. Consider the simple pattern "za*" that is to be searched in an input string of ASCII characters. The pattern is satisfied by z followed by any number, including 0, of a's. That is, a match corresponds to 'z', "za", "zaa", and so on. The word wise FSM for this pattern is shown in FIG. 3. The FSM starts in state 0 and remains there until a 'z' is received. When a 'z' is received, the FSM transitions to state 1 and reports a match. If any other character but 'a' is received in state 1, the FSM transitions back to state 0. If an 'a' is received while in state 1, the FSM loops back via 'a' and reports a match.

The problem with implementing this FSM in eight single bit FSMs can be most easily appreciated for the FSM dealing with the least significant bit. In ASCII, the least significant bit of a 'z' is 0, while that of an 'a' is 1. Assume that the FSM has transitioned from state 0 to state 1 because it received a 0. If the next bit received is not an 'a', the FSM is to return to state 1. If the next bit is from an 'a', the FSM remains in the current state and reports another match. The problem again lies in the FSM's inability to determine whether a 1 that is received next corresponds to an 'a' or some other character that has a 1 in its least significant bit. For example, an 's' also has a one in its least significant bit. Hence, the single bit FSM for implementing the FSM shown in FIG. 3 also fails.

Figure 4:
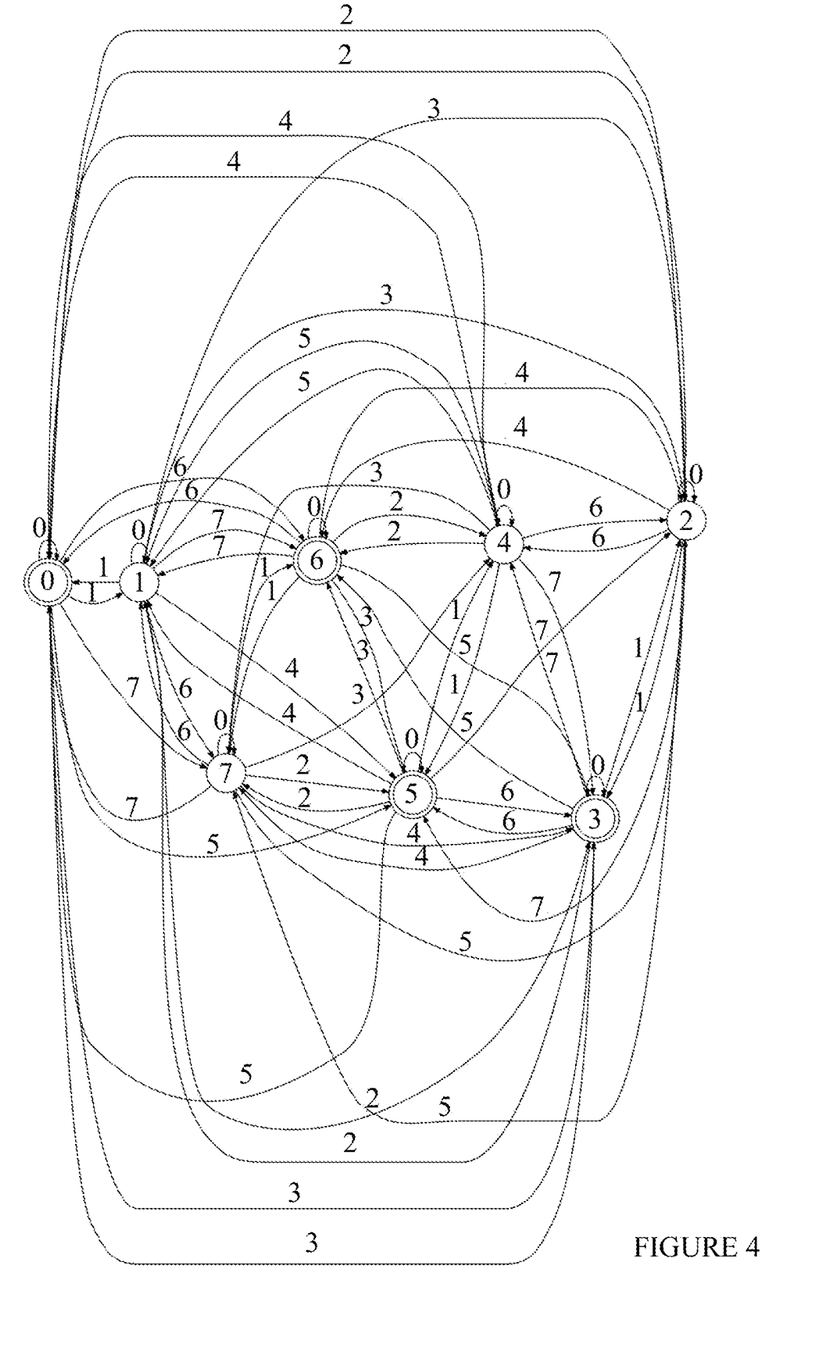
FIG. 4 illustrates a state diagram for an FSM that performs the same search as that shown in FIG. 1, but with only one token per edge.

The present invention avoids this problem by expanding the one word FSM for which the sub-word FSMs fail to a new FSM in which the sub-word FSMs operate correctly. Refer again to FIG. 1. One method for expanding the FSM to provide an FSM for which sub-word FSMs can be used is to expand the original FSM into an FSM in which each edge has a uniquely distinguishable token or set of tokens if there is no requirement to distinguish between them. Such an FSM is shown in FIG. 4, which is a state diagram for an FSM that performs the same search as that shown in FIG. 1, but with only one token per edge. Here, one token per edge is required, since all of the token values must be distinguished. The expansion is accomplished by splitting each of the multi-token edges in the original FSM into separate edges having one token per edge. Hence, the single edge with tokens "1, 2, 4, 7" is split into four edges, one corresponding to "1", one corresponding to "2", and so on. A new state is added to receive each of the new edges. There are eight edges leaving state 0 in the original FSM. The edge corresponding to a token value of 0 loops back to the state. Hence, seven additional states are needed to receive the remaining seven edges. These states are shown with state numbers 1-7. State 1 of the FSM shown in FIG. 4, however, is not the same as state 1 shown in FIG. 1.

The state numbers in FIG. 4 are chosen such that the state number corresponds to the edge value that resulted in a transition from state 0 to that state in FIG. 4. Hence state 2 is the result of a word having value 2 being received while the FSM was in state 0. For each of the new states, the original FSM is examined to determine the next state corresponding to each of the possible eight tokens. Referring again to FIG. 1, if a '2' is received after the FSM transitions to state 2, the FSM returns to state 0 and reports. Similarly, if a 4 was received after the FSM transitioned to state 4, the FSM returns to state 0 and reports. If a 3, 5, or 6 is received when the FSM is in state 0, the original FSM returned to state 0 and reported. Hence, states 0, 3, 5 and 6 in FIG. 4 are reporting states.

The remaining edges can be understood by following a sequence of input values and comparing the results to those obtained with the FSM of FIG. 1. For example, if a 4 is received followed by a 2, the FSM moves from state 0 to state 4 and then to state 6, which is a reporting state. This corresponds to the original FSM shown in FIG. 1 transitioning from state 0 to state 1 and then back to state 0 and reporting a match.

Figure 5A:
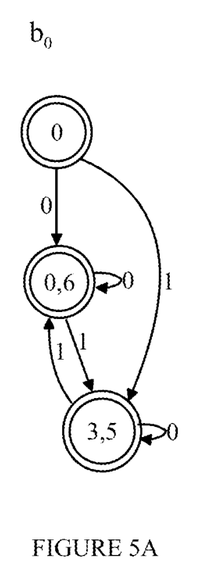
FIGS. 5A-5C illustrate the single bit FSMs for bits $b_0$, $b_1$, and $b_2$, respectively for the same search as that shown in FIG. 1.
Figure 5B:
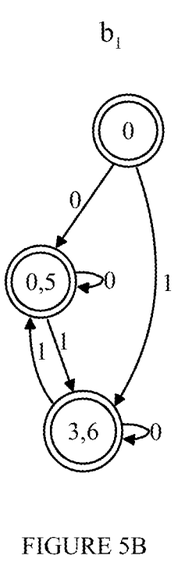
Figure 5C:
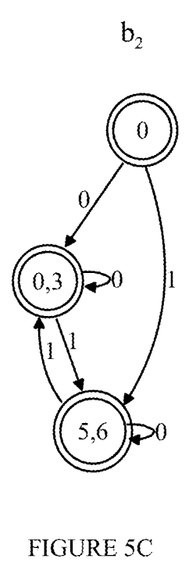

While the FSM shown in FIG. 4 is considerably more complex in that it has eight states compared to the two states of the minimal FSM shown in FIG. 1, the single bit FSMs derived from the FSM of FIG. 4 have only three states. Refer now to FIGS. 5A-5C which illustrate the single bit FSMs for bits $b_0$, $b_1$, and $b_2$, respectively. The manner in which the single bit FSMs are derived from the word wise FSM shown in FIG. 4 will now be explained with respect to the single bit FSM for $b_0$. The FSM for $b_0$ is derived by starting from state 0 shown in FIG. 4 and examining the states that are traversed for each possible input value of the bit in question when the FSM in FIG. 4 receives a whole word input and proceeds to its next state. To simplify the following discussion the FSM that processes $b_0$ will be referred to as $FSM_0$. The FSM in FIG. 4 that receives the entire word will be referred to as $FSM_w$.

Refer now to FIGS. 6A-6D, which illustrate the process by which $FSM_0$ is derived from $FSM_w$. If $FSM_0$ receives a 1 when it is at state 0, $FSM_w$ must have received an input word which has a 1 in $b_0$, i.e. an input word of 1, 3, 5 or 7. This input word would cause $FSM_w$ to advance to one of states 1, 3, 5, or 7. $FSM_0$ cannot tell which state was actually the state in question; this state is labeled A1 in FIG. 6. This state in $FSM_0$ will also be denoted by the list of possible states that could correspond to this state in FSMW. Similarly, if $FSM_w$ received an input word with a $b_0$=0, $FSM_0$ will proceed to a corresponding state. A0, in its state diagram. The words with $b_0$=–0 are 0, 2, 4, and 6. If FSM received one of the words, it will advance to one of states 0, 2, 4, or 6, depending on which word was actually received. Again, $FSM_0$ has no way of knowing the exact one of these states that is $FSM_w$: it only knows that $FSM_w$ is one of them. Accordingly, its new state, A0, corresponding to a '0' is labeled 0, 2, 4, 6.

The process is now repeated for each of the new states and the possible input values to $FSM_0$ of 0 and 1. Assume that $FSM_0$ is in A1 and a 1 arrives as the next input to $FSM_0$. This situation can occur if $FSM_w$ was in any of states 1, 3, 5, or 7 and the next input word was a 1, 3, 5, or 7. Hence, the next state, denoted as B1, corresponds to all of those states in $FSM_w$ that could be the end point if one of the potential input words was received by one of the possible states in the list in A1. These are summarized in the following table:

| starting state of $FSM_w$ | input value of $FSM_w$ for $b_0$ = 1 | | | |
|---|---|---|---|---|
| | 1 | 3 | 5 | 7 |
| 1 | 0 | 2 | 4 | 6 |
| 3 | 2 | 0 | 6 | 4 |
| 5 | 4 | 6 | 0 | 2 |
| 7 | 6 | 4 | 2 | 0 |

Figure 6A:
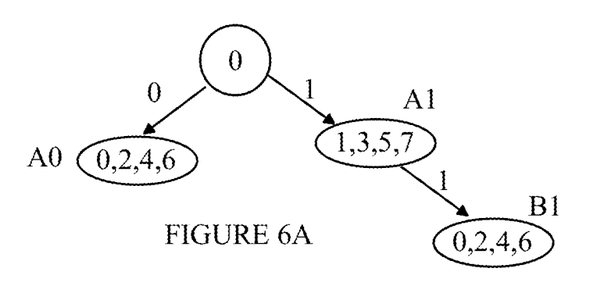
FIGS. 6A-6D illustrate the process by which $FSM_0$ for $b_0$ is derived from $FSM_w$.
Figure 6B:
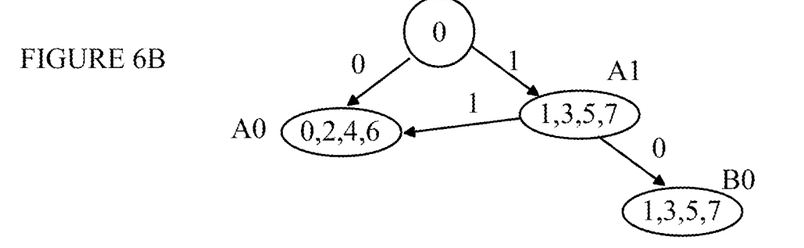

Hence, the possible states for B1 are 0, 2, 4, and 6: however, these are exactly the same states as state A0. Hence, states A0 and B1 are the same. Accordingly, the partially finished $FSM_0$ is now as shown in FIG. 6B. Next, the states that correspond to state B0 are determined. These states are the states that could have resulted from $b_0$=0 with one of the starting states in A1. These are summarized in the following table:

| starting state of $FSM_w$ | input value of $FSM_w$ for $b_0$ = 0 | | | |
|---|---|---|---|---|
| | 0 | 2 | 4 | 6 |
| 1 | 1 | 3 | 5 | 7 |
| 3 | 3 | 1 | 7 | 5 |
| 5 | 5 | 7 | 1 | 3 |
| 7 | 7 | 5 | 3 | 1 |

Figure 6C:
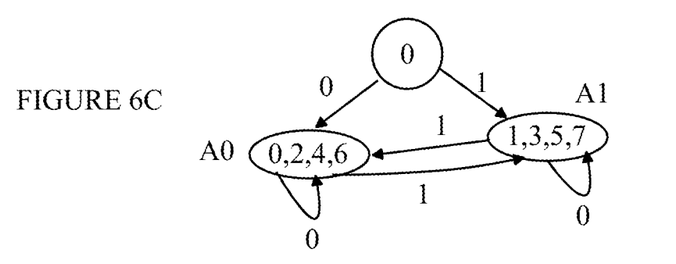

Hence, the possible $FSM_w$ states corresponding to B0 are 1, 3, 5, and 7. However, these are the same states as A1; hence A1 and B0 are the same state. Accordingly, the partially finished $FSM_0$ is now as shown in FIG. 6C.

This procedure is now repeated starting from the states in A0 and assuming that an input word having $b_0=1$ is received by FSM. The results are summarized in the following table.

| starting state of | input value of $FSM_w$ for $b_0 = 1$ | | | |
|---|---|---|---|---|
| $FSM_w$ | 1 | 3 | 5 | 7 |
| 0 | 1 | 3 | 5 | 7 |
| 2 | 3 | 1 | 7 | 5 |
| 4 | 5 | 7 | 1 | 3 |
| 6 | 7 | 5 | 3 | 1 |

Figure 6D:
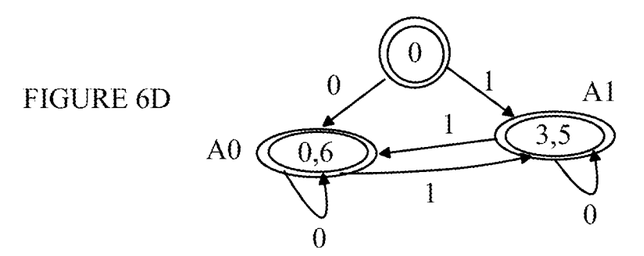

Hence, the states that result from a bit value of 1 being input to state A0 are again 1, 3, 5, and 7. These are the same states that corresponded to state A1; hence, no new state is created. That is, A0 transitions to A1 when a 1 is received. Repeating this procedure for A0 and an input bit of 0 results in a state that corresponds to $FSM_w$ states of 0, 2, 4, and 6. This is just A0 again. Accordingly, the final $FSM_0$ is as shown in FIG. 6C. The states in $FSM_w$ of interest are those that report out a match, i.e., states 0, 3, 5, and 6. Hence, $FSM_0$ must also report a possible match whenever it enters a state that corresponds to one of these reporting states. Upon entering one of these states, $FSM_0$ does not "know" which of the $FSM_w$ states has actually been reached, so it reports the list of possible states to the combiner 14 shown in FIG. 2. It should be noted that since states 1, 2, 4, and 7 are not reporting states, these states can be dropped from the list of states corresponding to each $FSM_0$ state, since reporting out these states would serve no function. Hence, the final $FSM_0$ state diagram is as shown in FIG. 6D. Here, the double circular boundaries indicate that $FSM_0$ will report the list of $FSM_w$ states within the list in that state to the combining circuit.

In practice, a match corresponding to state x is reported by combiner 14 when each single bit FSM reports out a match on receiving an input bit from the current input word and the lists of states reported by each single bit FSM contain state x.

In the above examples, an N-bit word FSM was replaced by N 1-bit wide FSMs. For large values of N, this strategy provides reduced memory requirements and a potential for some increase in speed due to the use of many simple small circuits rather than one large complex one. To provide additional speed improvements, a multi-word FSM can first be created from the original N-bit word FSM. For example, a two word wide FSM could be created from the one word wide FSM and then 2N single bit FSMs would be used to implement the two word wide FSM. In this case, an increase of up to a factor of two could be realized over the one-word FSM. Hence, the present invention has the potential to significantly reduce the time needed to scan a large data set for a variable pattern.

In some cases, larger sub-word FSMs may be more efficient depending on the specific search pattern being implemented. For the purposes of the present discussion, a sub-word FSM is defined to be an FSM that operates on less than all of the bits of the words in the input data sequence. For example, a 64-bit word FSM could be implemented as 32 2-bit FSMs or 16 4-bit FSMs. In addition, not all of the sub-word FSMs need be the same size. In the above-described procedure, the one word wide variable pattern FSM was first expanded to provide an FSM with one token on each edge to arrive at an FSM that could be reliably implemented as a plurality of sub-word FSMs. However, other strategies could be utilized.

The problems encountered in finding a single bit FSM version of the FSM in FIG. 1 arise from the multiple tokens on the edges that required differentiation. If the set of tokens on the edge cannot be differentiated by the single bit FSMs, then directly converting the FSM to an implementation with multiple single bit FSMs fails. To relieve the problem, the edge is split into two edges with part of the tokens going onto the new edge. If the set of tokens on each of the edges can now be differentiated by the single bit FSMs, further splitting is not needed. In the extreme case, states are added until there is only a single token on any edge; however, in many cases the process will be terminated before this extreme is reached. In this previous example that described a case insensitive FSM that recognized 't', 'T' or, 's', 'S', there was no need to differentiate 'S' from 's' or 'T' from 't' and therefore those edges did not need to be split.

Figure 7A:
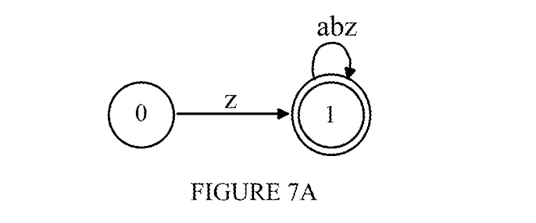
FIGS. 7A-7D illustrate the advantages of using a set of sub-word FSMs with more than one bit.
Figure 7B:
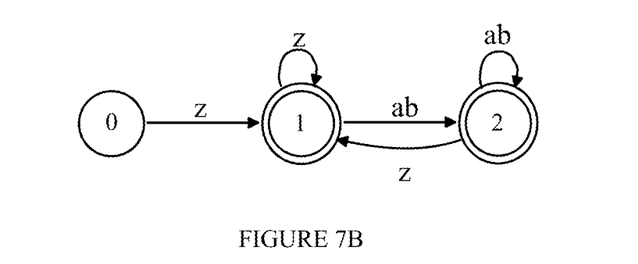
Figure 7C:
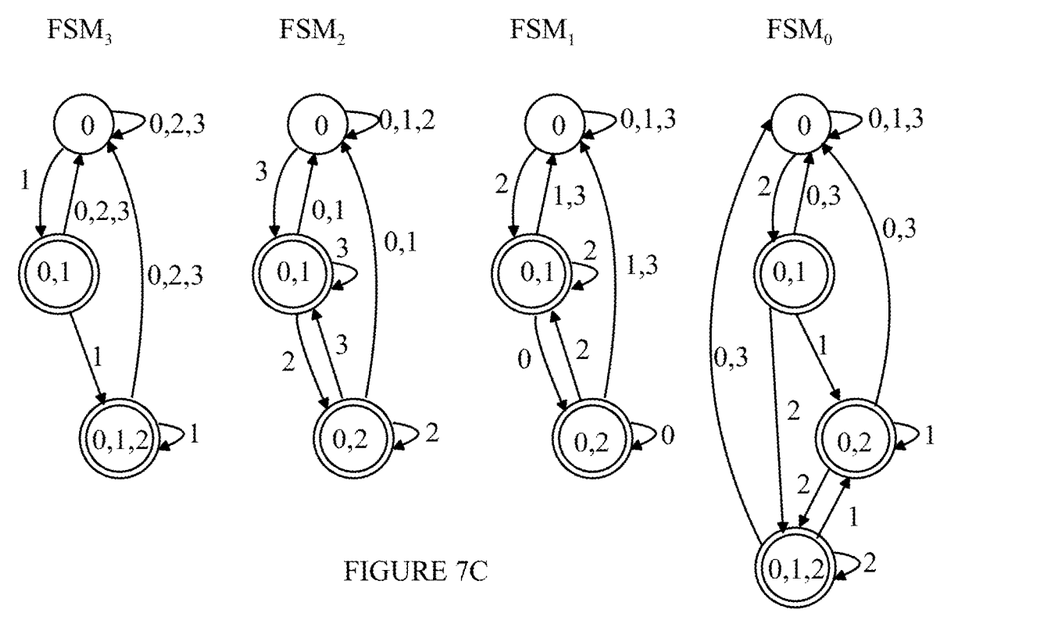

Refer now to FIGS. 7A-7C, which illustrate the advantages of using a set of sub-word FSMs with more than one bit. FIG. 7A shows the one word (8-bit) state diagram for an FSM that recognizes the pattern "z[ab]*". This pattern is satisfied by a 'z' followed by zero or more of one of either 'a' or 'b'. So that it can recognize "za", "zza", "zb", "zzb", "zab" "zzabb" and so on. To simplify the drawings, the return edges to state "0" for an input that is not a 'z', 'a', or 'b' have been omitted from the drawings.

The ASCII values for 'z', 'a' and 'b' are given in the following table:

| Token | bit 7 | bit 6 | bit 5 | bit 4 | bit 3 | bit 2 | bit 1 | bit 0 |
|---|---|---|---|---|---|---|---|---|
| z | 0 | 1 | 1 | 1 | 1 | 0 | 1 | 0 |
| a | 0 | 1 | 1 | 0 | 0 | 0 | 0 | 1 |
| b | 0 | 1 | 1 | 0 | 0 | 0 | 1 | 0 |

The problem with implementing this FSM in eight single bit FSMs can be most easily appreciated for the FSM dealing with the least significant bit. In ASCII, the least significant bit of a 'z' is 0, while that of an 'a' is 1. Assume that the FSM has transitioned from state 0 to state 1 because it received a 0. If the next bit received is not an 'a', the FSM is to return to state 0. If the next bit is from an 'a', the FSM remains in the current state and reports another match. The problem again lies in the FSM's inability to determine whether a 1 that is received next corresponds to an 'a' or some other character that has a 1 in its least significant bit. For example, an 's' also has a one in its least significant bit and needs the FSM to transition to state 0 not state 1.

Refer now to FIG. 7B, which illustrates an expanded state diagram for an implementation of the FSM shown in FIG. 7A using 2-bit sub-word FSMs. A 2-bit FSM cannot differentiate the 'z' from the 'a' or 'b', but it can differentiate between 'a' or 'b'; hence, the "ab" edge does not need to be split further since the least two significant bits of the tokens 'a', 'b' are sufficiently different. However, a new state is needed, since once in the state 1, as shown in FIG. 7A, the 2-bit FSMs cannot differentiate between another 'z' and an 'a' or a 'b'.

Hence, the FSM in FIG. 7A is expanded by adding a new state 2 that becomes the next state if the FSM is in state 1 and 'a' or 'b' is received. In principle a new state for the input of 'z' could be created to accept the now split 'z' edge.

However, an input of 'z' returns to state 1; hence, no new state is needed. The new state 2 has two possible inputs of interest, the remaining inputs being "fails" that return to state 0 and are not shown. The first input is an 'a' or a 'b', which is a match state and returns to state 2. If a 'z' is received while in state 2, a match occurs and the FSM returns to state 1 to look for another 'z', 'a', or 'b'. Since no further new states are needed, the expansion stops with the addition of state 2.

In general, the process of expanding an arbitrary one word FSM to remove edges with multiple tokens that cannot be resolved at the sub-word level proceeds in an analogous manner. An edge that cannot be resolved at the desired sub-word level will be referred to as an ambiguous edge. The ambiguous edge is split into two or more edges such that each edge is now resolvable at the desired sub-word level. That is, the new edges are all not ambiguous. New states are introduced to receive the new edges. The one word pattern being matched is then used to examine each possible input for each of the new states. If an input returns to a known state, that edge is directed to that state and no further actions are needed for that edge. If the input causes the FSM to move to a state that is not already known, that new state is introduced and connected by the edge in question. For each new state, all of the possible inputs are explored and edges to corresponding states are created, either a new state or a previously known state. When all inputs to all new states have been explored and no new states are needed, the process terminates.

Refer now to FIG. 7C, which illustrates the four 2-bit FSM created from the FSM in FIG. 7B. In the case of $FSM_0$, the initial transition is only triggered if a 'z' is received. The least significant two bits of a 'z' are '10' in binary or 2 in decimal; hence, receiving a 2 moves $FSM_0$ to the second state which is labeled "0,1". This second state could result from a fail in the one word FSM, i.e., another character that's not 'z', but has its two least significant bits equal to decimal 2; hence it is labeled '0' or it could be from a 'z', and hence it is also labeled '1'. The other parts of the sub-word $FSM_1$, $FSM_2$ and $FSM_3$ differentiate the true input value, and hence, it is enough for $FSM_0$, to know that this is not 0, 1, or 3 decimal. If the one word FSM had not been expanded to obtain FIG. 7B, then the sub-word $FSM_0$ would become confused when differentiating between 'z', 'a', 'b'. For example, while both 'z' and 'b' are the similar, input 'a' is different thus creating a conflict. As a consequence, for example, 'a' is confused with 'i' (which should be a fail) and 'b' and 'z' are the same as 'j' (which should also be a fail).

The manner in which $FSM_0$ is obtained from FIG. 7B will now be discussed in more detail with reference to FIGS. 8A-8D, which illustrate various stages in the construction of $FSM_0$. Referring to FIG. 7B, the process states at state 0, from which all the possible edges for each input from 0 to 3 in decimal that is '00', '01', '10' and '11' in binary are explored. For inputs 0, 1, and 3 decimal, the FSM goes back to state 0 and for input 2 decimal, the FSM could go to both state 0 on a fail and state 1 on a 'z', the resultant first step in shown in FIG. 8A. We now have a new compound state that is labeled "0,1".

Figure 8A:
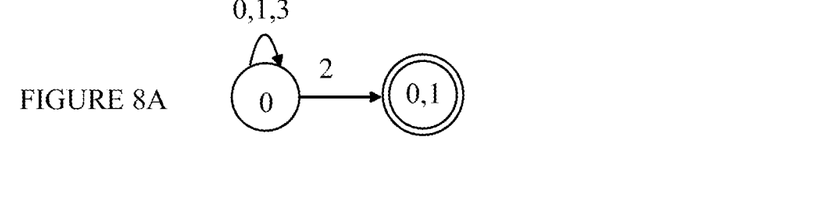
FIGS. 8A-8D illustrate various stages in deriving a 2-bit FSM for bits 0 and 2 of the one word FSM shown in FIG. 7B which is equivalent to the FSM in FIG. 7A.
Figure 8B:
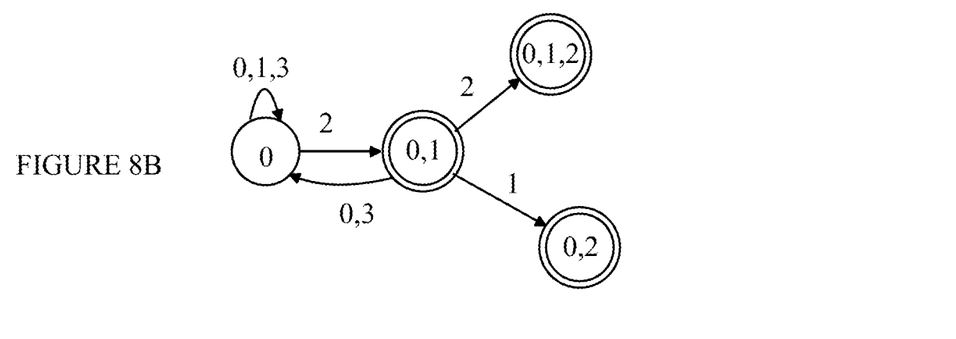

Next, all possible edges from this new state "0,1" in the word wise FSM in FIG. 7B are explored. From both state 0 and state 1 for inputs 0 and 3 decimal, the FSM goes back to state 0; this is a fail. However, for an input of 1, the one word FSM goes state 0 on a fail and state 2 on 'a'; hence, a new compound state "0,2" is created. For an input of 2, the one word FSM goes to state 0 on 'a' (fail) 2, state 1 on 'z' and state 2 on a 'b'; hence, a new compound state "0,1,2" is created. These new states are shown in FIG. 8B.

Figure 8C:
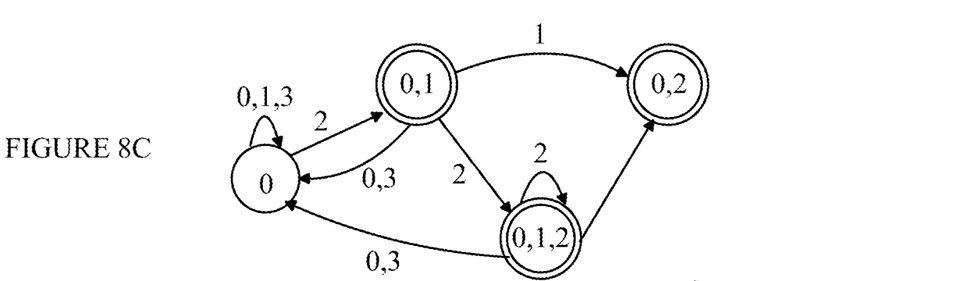
Figure 8D:
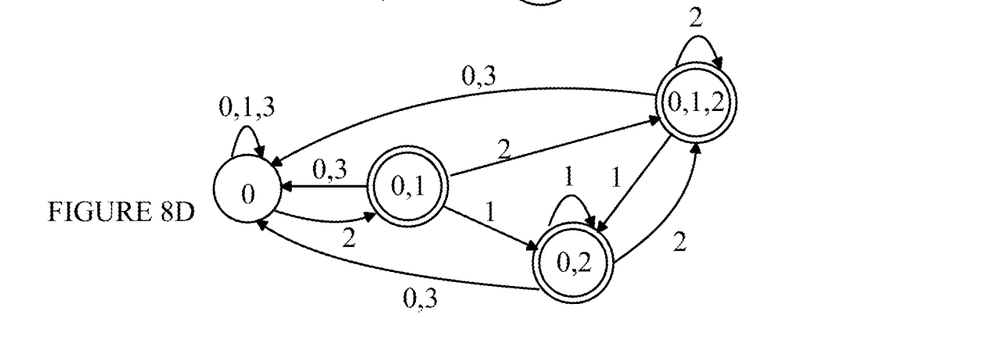

The process must now be repeated for the two new compound states "0,2" and "0,1,2" by exploring the possible transitions for the various inputs when the one word FSM is in these states. For state "0,1,2" inputs 0 and 3 decimal are a fail and return to state 0. However, for input 1, the FSM goes to state 0 on fail and 2 on 'a'. The compound state "0,2" already exists, so no new state is needed. For input 2, the one word FSM goes to state 0 on 'a' (fail), state 1 on 'z' and state 2 on a 'b'. Again, the compound state "0,1,2", has already been defined, and hence, the result of this expansion is shown in FIG. 8C.

Finally, the transitions corresponding to the various inputs to the compound state "0,2" must be explored. Inputs 0 and 3 decimal are a fail and return the one word FSM to state 0. However, for input 1, the one word FSM goes to state 0 on a fail and state 2 on 'a'. The compound state "0,2" already exists. For input 2, the one word FSM goes to state 0 on 'a' (fail), state 1 on 'z', and state 2 on a 'b'. This compound state "0,1,2" already exists and hence, the state diagram is left as in FIG. 8D.

Figure 7D:
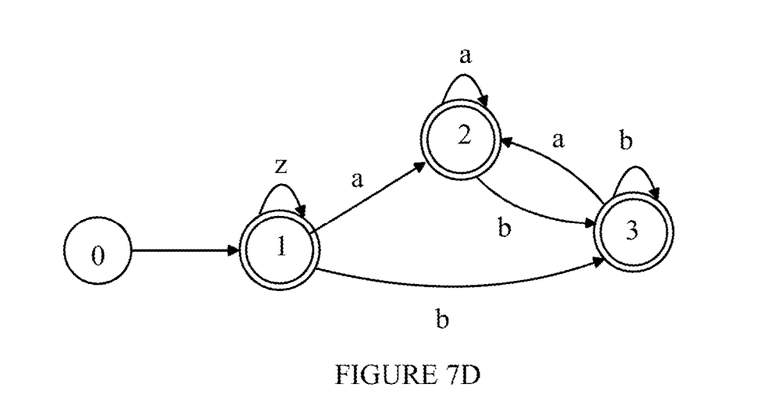

Refer now to FIG. 7D, which illustrates an expanded state diagram for an implementation of the FSM shown in FIG. 7A using 1-bit sub-word FSMs. A 1-bit FSM cannot differentiate between 'a' or 'b' or 'z'. Hence, all multiple tokens must be expanded as shown in FIG. 7D.

Figure 9A:
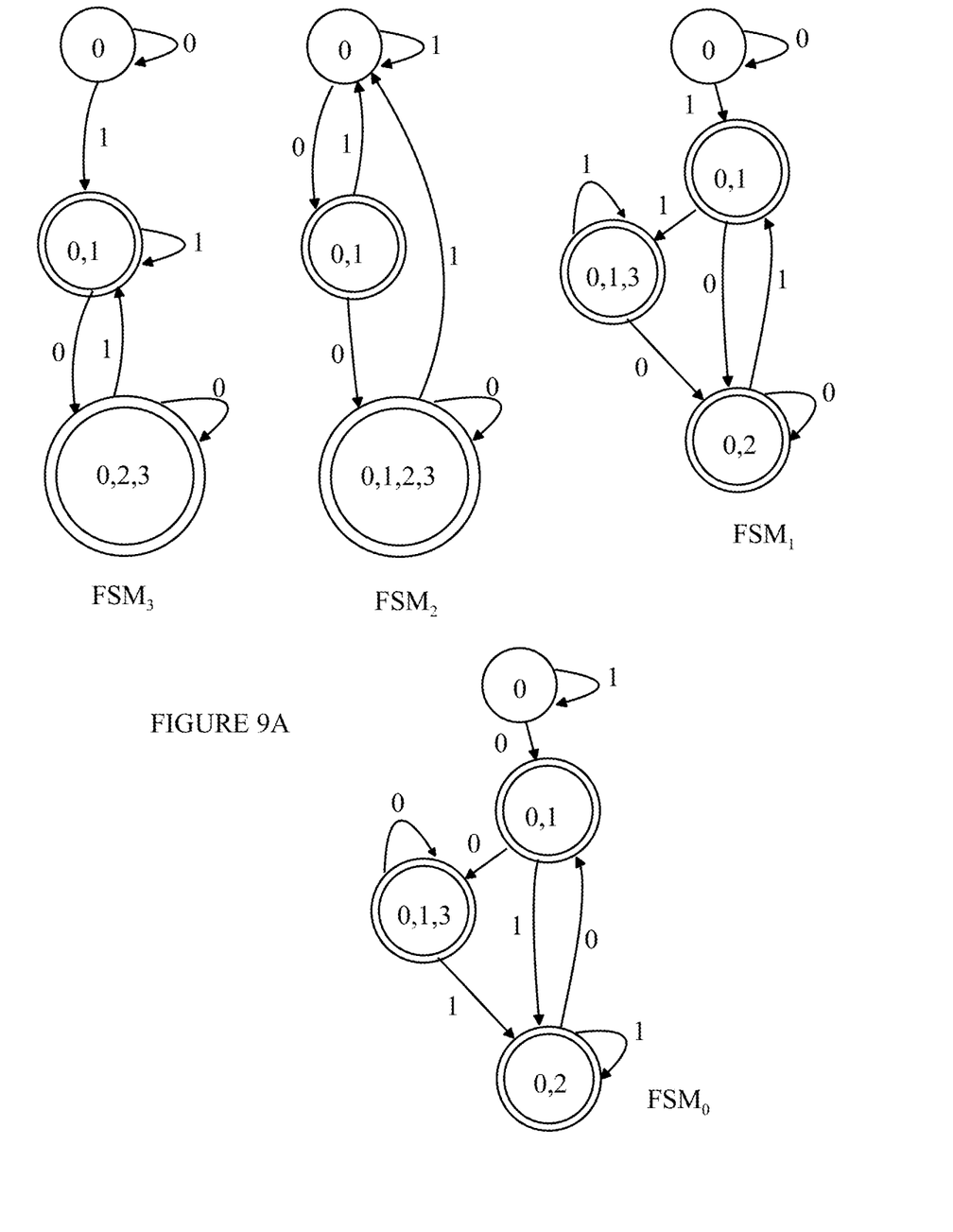
FIGS. 9A-9B illustrate the eight single-bit FSMs for implementing the one word FSM shown in FIG. 7D which is equivalent to the FSM in FIG. 7A.
Figure 9B:
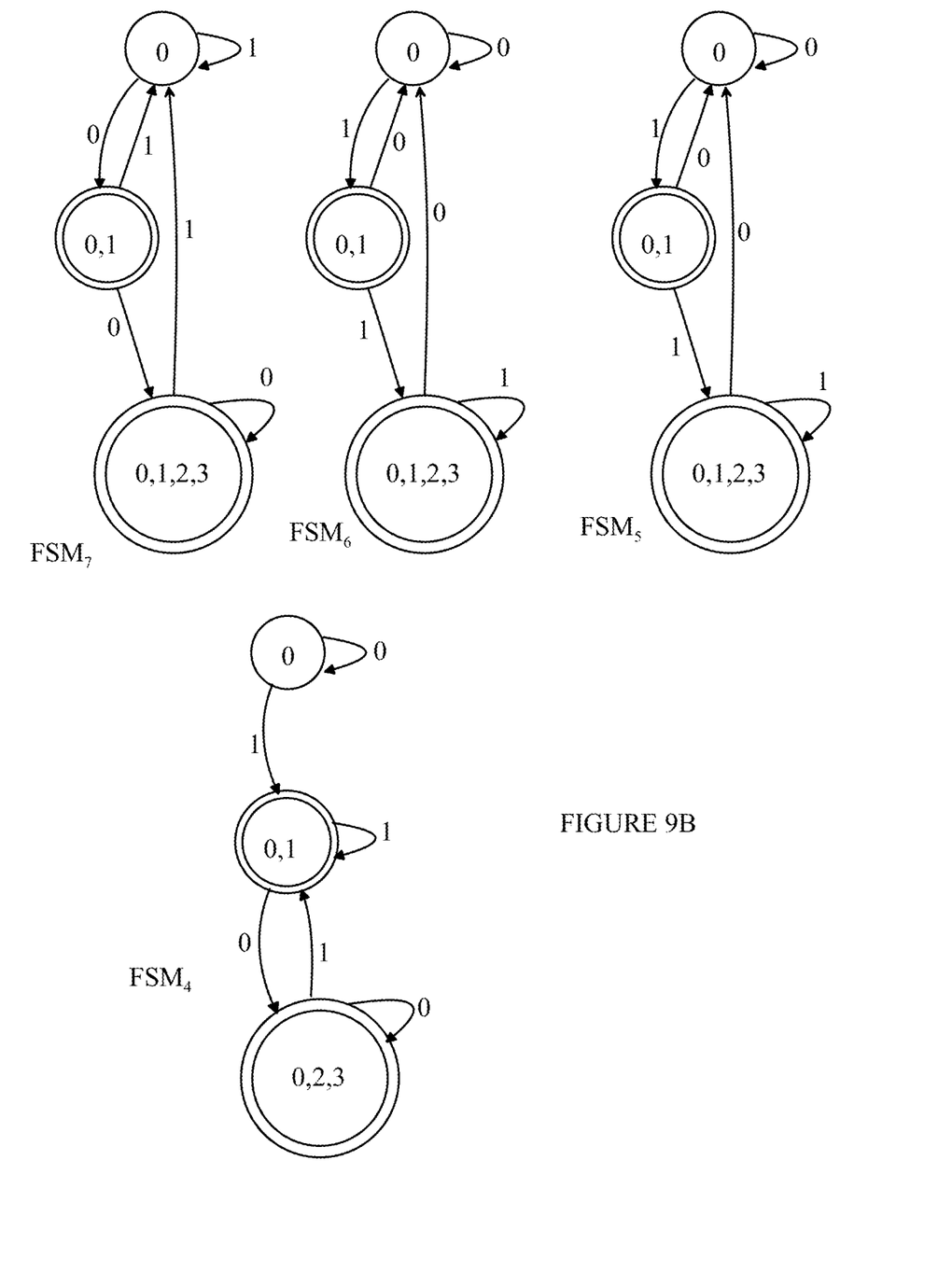

Refer now to FIG. 9A-B which illustrates the eight 1-bit sub-word FSMs created from the word FSM in FIG. 7D. The FSMs in FIG. 7A or 7B cannot be used to create 1-bit sub-word FSM for "z[ab]*" as neither of these FSMs can differentiate between 'a', 'b', 'z' and a fail at the 1-bit sub-word level. Instead, a one word FSM in which all of the multiple token edges are reduced to single token edges so that the inputs can be correctly differentiated is required. Such an FSM is shown in FIG. 7D. The resulting single bit FSMs are shown in FIGS. 9A-9B.

In the above-described embodiments, a one word FSM was emulated using a plurality of sub-word FSMs working in parallel. In these embodiments, each bit of the one word FSM was processed in at least one of the sub-word FSMs. However, there are cases in which not all of the sub-word FSMs are required. That is, one or more of the one word FSMs is redundant. Consider the case in which the one word FSM searches an ASCII string for a specific sequence of characters and in which the case of the characters does not matter. For example, the FSM could search for the sequence "mad" in which each character could be upper or lower case. That is, the sequences Mad, mad, MAd, etc. satisfy the target sequence. If this FSM is replaced by seven single-bit FSMs, the FSM that operates on the fifth most significant bit is redundant, since this bit merely distinguishes between a lower case letter and an upper case letter.

In another aspect of the present invention, each FSM in the set of sub-word FSMs is tested for redundancy. If the candidate FSM is redundant, the candidate can be eliminated from the set of sub-word FSMs with a corresponding reduction in computational workload and memory. Consider all possible inputs to the one word FSM. Suppose the one word FSM reports out a match at state K in the one-word FSM for one of the inputs to that FSM. All of the sub-word FSMs must report out a match in which the intersection of the lists reported by each sub-word FSM is "K". The candidate sub-word FSM is redundant if:

(1) the remaining sub-word FSMs report matches and the intersection of the match lists is the state K.

(2) the candidate sub-word FSM also reports out a match state with a list containing K.

(3) For any non-match state in the one word FSM, at least one of the remaining sub-word FSMs is in a non-match state or the intersection of the match state lists reported by the remaining sub-word FSMs is null.

The computational workload to test a candidate FSM can be reduced significantly by altering the manner in which the sub-word FSMs are generated from the one word FSM. In the above-described procedure, each state in a sub-word FSM that reports a match has a list of reporting states in the one word FSM that could correspond to that state in the sub-word FSM. In the modified procedure, the list associated with each state in the sub-word FSM contains all states in the one-word FSM that could correspond to that state in the sub-word FSM. In addition, all states in the one word FSM, not just the reporting states, are included in this list. Finally, each state in the sub-word FSM includes a corresponding list of possible states in the one word FSM whether or not that state in the sub-word FSM is a reporting state.

Assume each sub-word FSM reports at each state with the list of possible states in the one word FSM that correspond to that state. This report occurs whether or not the sub-word FSM is in a match reporting state. Hence, for any state in the one-word FSM, all possible sub-word FSM states in each sub-word FSM are known. In particular, denote the sub-word FSMs other than the candidate FSM by the "remaining sub-word FSMs".

Consider a state, Q, in the one word FSM. Q will appear in one or more of the lists of the sub-word FSMs. To simplify the following discussion, assume that the candidate FSM is sub-word $FSM_0$. The remaining sub-word FSMs will be labeled $FSM_1$, $FSM_2$, ... $FSM_N$. Consider $FSM_1$. Each state has a list of one-word FSM states associates with that state. Define a vector $S[s_1, \ldots, s_N]$, where $s_1$ is a state of sub-word $FSM_1$, $s_2$ is a state of $FSM_2$, etc. Each of these states has a corresponding list that provides the possible lists in the one word FSM. Define $S[s_1, \ldots, s_N]=Q$ if all of the lists in the states contain state Q in the one word FSM. The vector $[s_1, \ldots, s_N]$ will be referred to as the sub-word state vector in the following discussion.

Consider the case in which Q is a reporting state. Then there is at least one state vector for which the remaining FSMs report a match. Consider all possible state vectors for which S=Q. For each state vector, each sub-word FSM will report out a list that includes Q and possibly other states. Compute the intersection of the lists for each of these states. There are two cases of interest, either the intersection includes only reporting state Q or there are multiple reporting states. If the intersection includes multiple reporting states, then $FSM_0$ is needed to resolve the ambiguity, and hence, $FSM_0$ is not redundant. If the reporting state is uniquely Q then $FSM_0$ is not needed to resolve any ambiguity corresponding to Q, and hence, $FSM_0$ is possibly redundant.

If $FSM_0$ is possibly redundant, then the above test must be repeated for each value of Q in which Q is a reporting state in the one word FSM. Assume that the results are the same, i.e., $FSM_0$ is possibly redundant. Then the remaining sub-word FSMs can uniquely identify each reporting state in the one-word FSM.

Hence, in this case $FSM_0$ is not needed to identify a match. $FSM_0$ could be needed, however, to defeat a false positive. Consider the case in which Q is not a reporting state in the one word FSM, and there is a state vector corresponding to Q in which the intersection of the states happens to include a reporting state K. While this is expected to be a rare occurrence, it could occur. In this case $FSM_0$ is needed to eliminate the false positive, and hence, is not redundant.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:

1. An apparatus that searches an input stream comprising a sequence of data words in order to identify a pattern in the input stream, each data word being N-bits wide, said apparatus comprising:
   a processor adapted to receive a collection of match outputs from single bit FSMs; and
   a non-tangible memory that stores instructions executable by the processor, wherein the instructions comprise a plurality of sub-word finite state machines (FSMs), each sub-word FSM having a word size less than N-bits, wherein when executed, the instructions cause the processor to:
   execute the sub-word FSMs to process corresponding segments of said data words in parallel, respectively;
   generate a match output for each sub-word FSM that transitions to a match state based on a corresponding segment of said data words matching said pattern;
   generate a combined pattern match output when all of the FSMs generate the match outputs, indicating a match of said data words to said pattern; and
   determine when there is a common state reported by all of the single bit FSMs,
   wherein: said pattern is a variable pattern specifying a string that cannot be predicted in advance in terms of length; and the input stream comprises a series of measurements produced by a digital oscilloscope data.

2. The apparatus of claim 1, wherein said apparatus emulates a single FSM operating on said data words to match said pattern, and wherein said match output corresponds to different possible match states in said single FSM.

3. The apparatus of claim 1, wherein said apparatus emulates a single FSM operating simultaneously on a plurality of said data words.

4. The apparatus of claim 1, wherein said pattern does not have a predetermined fixed length.

5. The apparatus of claim 1, wherein said pattern corresponds to an FSM having multiple tokens on an edge that needs to be distinguished.

6. The apparatus of claim 1, wherein one bit of said data words is not processed by any of said sub-word FSMs.

7. The apparatus of claim 1, wherein each sub-word FSM is configured to transition to the match state without regard to transitions being made in other sub-word FSMs.

8. The apparatus of claim 1, wherein the input stream comprises a series of measurements produced by a digital oscilloscope data.

9. A method for operating a computer to identify a variable pattern in an input data stream comprising a sequence of input words, wherein the variable pattern specifies a string that cannot be predicted in advance in terms of length, each input word comprising a plurality of sub-words having fewer bits than said input words, said method comprising:

receiving a collection of match outputs from single bit FSMs;

operating a plurality of sub-word finite state machines (FSMs) in parallel on different sub-words, respectively, of each of said input words;

providing a matched output indicative of a possible pattern match for each sub-word FSM that transitions to a matched state based on the respective sub-word of said input words matching the variable pattern;

determining when all of said matched outputs of said sub-word FSMs of each of said input words are provided, indicating a common matched state of said input words to said variable pattern;

determining when there is a common state reported by all single bit FSMs; and outputting that common matched state wherein the input data stream comprises a series of measurements produced by a digital oscilloscope data.

10. The method of claim 9, wherein said plurality of sub-word FSMs emulate a single FSM operating simultaneously on said input words.

11. The method of claim 9, wherein said variable pattern does not have a predetermined fixed length.

12. The method of claim 9, wherein said variable pattern corresponds to an FSM having multiple tokens on an edge that needs to be distinguished.

13. The method of claim 9, wherein one bit of said input words is not processed by any of said sub-word FSMs.

14. The method of claim 9, wherein each sub-word FSM is configured to transition to the matched state without regard to transitions being made in other sub-word FSMs.

* * * * *